(12) United States Patent
Morehead et al.

(10) Patent No.: US 9,568,803 B2
(45) Date of Patent: Feb. 14, 2017

(54) CASCADED OPTICAL HARMONIC GENERATION

(71) Applicant: Lumentum Operations LLC, Milpitas, CA (US)

(72) Inventors: James J. Morehead, Milpitas, CA (US); Loren A. Eyres, Palo Alto, CA (US); Bertram C. Johnson, Milpitas, CA (US); Martin H. Muendel, Oakland, CA (US); Derek A. Tucker, Milpitas, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/177,140

(22) Filed: Jun. 8, 2016

(65) Prior Publication Data

US 2016/0291443 A1 Oct. 6, 2016

Related U.S. Application Data

(63) Continuation-in-part of application No. 14/719,617, filed on May 22, 2015, now Pat. No. 9,377,667.

(Continued)

(51) Int. Cl.
*G02F 1/35* (2006.01)
*G02F 1/37* (2006.01)
*H01S 3/00* (2006.01)

(52) U.S. Cl.
CPC .............. *G02F 1/37* (2013.01); *G02F 1/3501* (2013.01); *G02F 1/353* (2013.01); *H01S 3/0092* (2013.01);

(Continued)

(58) Field of Classification Search
None
See application file for complete search history.

(56) References Cited

U.S. PATENT DOCUMENTS

| 5,452,312 A | 9/1995 | Yamamoto et al. |
| 5,850,407 A | 12/1998 | Grossman et al. |

(Continued)

FOREIGN PATENT DOCUMENTS

| JP | H03-145777 A | 6/1991 |
| JP | 2000343261 A | 12/2000 |
| WO | WO 2010/111094 A2 | 9/2010 |

OTHER PUBLICATIONS

European Search Report corresponding to EP 15 16 8631, mailed Oct. 28, 2015, 7 pages.

(Continued)

*Primary Examiner* — Hemang Sanghavi
(74) *Attorney, Agent, or Firm* — Harrity & Harrity, LLP

(57) ABSTRACT

A cascaded harmonic generator, for cascaded optical harmonic generation from an optical beam provided by a laser source, may include a second harmonic generator to generate a second harmonic optical beam based on a residual beam associated with the optical beam. The cascaded harmonic generator may include a third harmonic generator to generate a third harmonic optical beam based on the second harmonic optical beam and the optical beam. The third harmonic generator may be positioned in an optical path upstream from the second harmonic generator. A harmonic generator delay time, associated with the optical path, may be approximately equal to, or may be an approximate integer multiple of, a laser source round-trip time.

20 Claims, 17 Drawing Sheets

Related U.S. Application Data

(60) Provisional application No. 62/002,006, filed on May 22, 2014.

(52) U.S. Cl.
CPC . *G02F 2001/3503* (2013.01); *G02F 2001/354* (2013.01); *G02F 2001/3507* (2013.01); *G02F 2001/3509* (2013.01)

(56) References Cited

U.S. PATENT DOCUMENTS

| | | | |
|---|---|---|---|
| 6,047,011 | A | 4/2000 | Cook |
| 2006/0126677 | A1* | 6/2006 | Sun .................. B23K 26/0604 372/30 |
| 2008/0158638 | A1 | 7/2008 | Furuya |
| 2009/0161703 | A1 | 6/2009 | Seelert et al. |
| 2013/0077086 | A1 | 3/2013 | Chuang |
| 2013/0188658 | A1* | 7/2013 | Starodoumov ..... H01S 3/06758 372/22 |
| 2014/0362880 | A1 | 12/2014 | Chuang |
| 2015/0338719 | A1 | 11/2015 | Meundel |
| 2016/0056606 | A1* | 2/2016 | Chuang .................. G02F 1/353 355/67 |

OTHER PUBLICATIONS

Wang et al., "High Power Q-switched $TEM_{00}$ Mode Diode-Pumped Solid State Lasers with > 30W Output Power at 355nm", Invited Paper, Proc of SPIE, vol. 6100, 610019-1 to 13, Feb. 2006.

\* cited by examiner

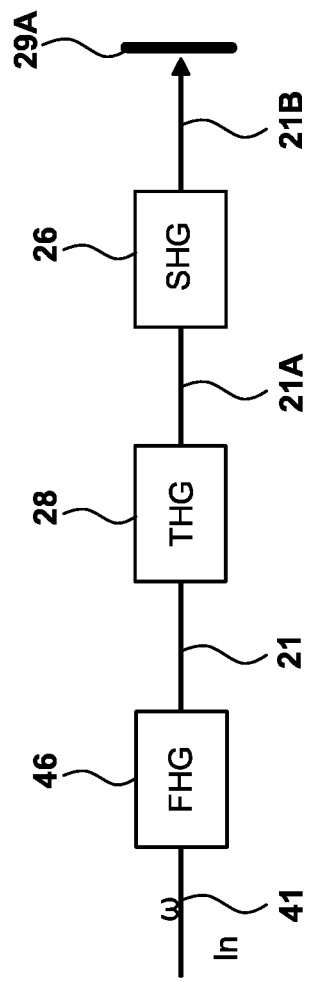
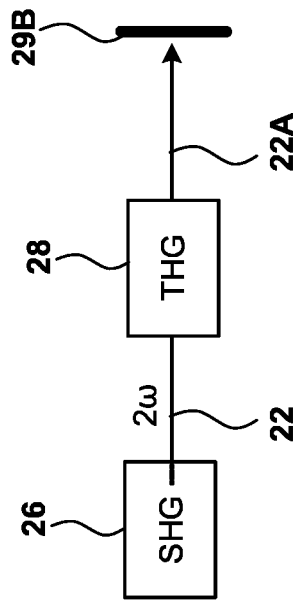
FIG. 5A
FIG. 5B

CASCADED OPTICAL HARMONIC GENERATION

RELATED APPLICATION

This application is a Continuation-In-Part (CIP) of U.S. patent application Ser. No. 14/719,617, filed on May 22, 2015 which claims priority to U.S. Provisional Patent Application No. 62/002,006 filed May 22, 2014, the content of which is incorporated by reference herein in its entirety.

TECHNICAL FIELD

The present disclosure relates to light sources, and in particular to devices and methods for cascaded optical harmonic generation.

BACKGROUND

Optical harmonic generation may be used to convert laser light from one wavelength to a shorter wavelength, i.e. a higher frequency. For example, frequency doubling, or second harmonic generation ("SHG"), may be used to obtain visible light from near infrared light. In addition, frequency tripling, also referred to as third harmonic generation ("THG"), may be used to obtain blue, violet, and ultraviolet (UV) light from near infrared light. The frequency doubled and tripled light may then be used for spectroscopy, materials processing, optical pumping, etc.

The optical frequency of laser light may be tripled using cascaded nonlinear optical crystals. Referring to FIG. 1, a prior-art cascaded harmonic tripler 10 is shown as an example. The cascaded harmonic tripler 10 includes sequentially disposed second harmonic 12 and third harmonic 13 crystals, and a dichroic mirror (or filter) 15. In operation, a fundamental light beam 11 at optical frequency $\omega$ impinges on the second harmonic crystal 12. Since a nonlinear conversion efficiency is less than 100%, only a portion of the fundamental light beam 11 is frequency doubled, so that a second harmonic beam 14 at a second harmonic frequency $2\omega$ exits the second harmonic crystal 12 together with an unconverted portion 11A of the fundamental optical beam 11. The second harmonic beam 14 and the unconverted portion 11A of the fundamental optical beam 11 impinge on the third harmonic crystal 13, which converts a portion of these beams into a third harmonic beam 19 at a third harmonic frequency $3\omega$. Thus, three beams exit the third harmonic crystal 13: an unconverted portion 11B of the unconverted portion 11A of the fundamental optical beam 11, an unconverted portion 14A of the second harmonic beam 14, and the third harmonic beam 19. The dichroic mirror 15 redirects the fundamental 11B and second harmonic 14A beam portions, and transmits the third harmonic beam 19 as a desired output.

One drawback of the prior-art cascaded harmonic tripler 10 is that tight focusing of the fundamental 11A and second harmonic 14 beams into the third harmonic crystal 13 is typically required to obtain reasonable conversion efficiency. One drawback of tight focusing is that a small spot diameter of the fundamental 11A and second harmonic 14 beams may compromise beam quality due to a beam walkoff effect. Another drawback is that a UV-induced degradation of the third harmonic crystal 13 output surface may result after tens or hundreds of hours of exposure at UV peak power densities in the 200 MW/cm² range and average powers in the Watt range or more.

SUMMARY

According to some possible implementations, a cascaded harmonic generator for cascaded optical harmonic generation from an optical beam provided by a laser source, may include: a second harmonic generator to generate a second harmonic optical beam based on a residual beam associated with the optical beam; and a third harmonic generator to generate a third harmonic optical beam based on the second harmonic optical beam and the optical beam, where the third harmonic generator may be positioned in an optical path upstream from the second harmonic generator, where a harmonic generator delay time, associated with the optical path, is approximately equal to, or is an approximate integer multiple of, a laser source round-trip time.

According to some possible implementations, a harmonic generator may include: a higher harmonic generator to generate a higher harmonic optical beam based on a lower harmonic optical beam and an optical beam provided by a laser source; and a lower harmonic generator to generate the lower harmonic optical beam based on a residual beam associated with the optical beam, where the lower harmonic generator may lie on an optical path downstream from the higher harmonic generator, and the harmonic generator may have a harmonic generator delay time, associated with the optical path, that is approximately equal to, or an approximate integer multiple of, a laser source round-trip time.

According to some possible implementations, a method may include: propagating, by a cascaded harmonic generator and along an optical path, an optical beam through a third harmonic generator, where the optical beam may be provided by a laser source; propagating, by the cascaded harmonic generator and along the optical path, the optical beam through a second harmonic generator to generate a second harmonic optical beam based on the optical beam, where the optical beam may be propagated through the second harmonic generator after the optical beam is propagated through the third harmonic generator; and propagating, by the cascaded harmonic generator and along the optical path, the second harmonic optical beam through the third harmonic generator, where the second harmonic optical beam may overlap the optical beam in the third harmonic generator to permit the third harmonic generator to generate a third harmonic optical beam, where a delay time, associated with the optical path, is approximately equal to, or is an approximate integer multiple of, a round-trip time associated with the laser source.

BRIEF DESCRIPTION OF THE DRAWINGS

FIGS. 5A to 5D illustrate optical paths of a fundamental optical beam (FIG. 5A); a second harmonic beam (FIG. 5B); a third harmonic beam (FIG. 5C); and a fourth harmonic beam (FIG. 5D) of the cascaded harmonic generator of FIG. 4;

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 2:
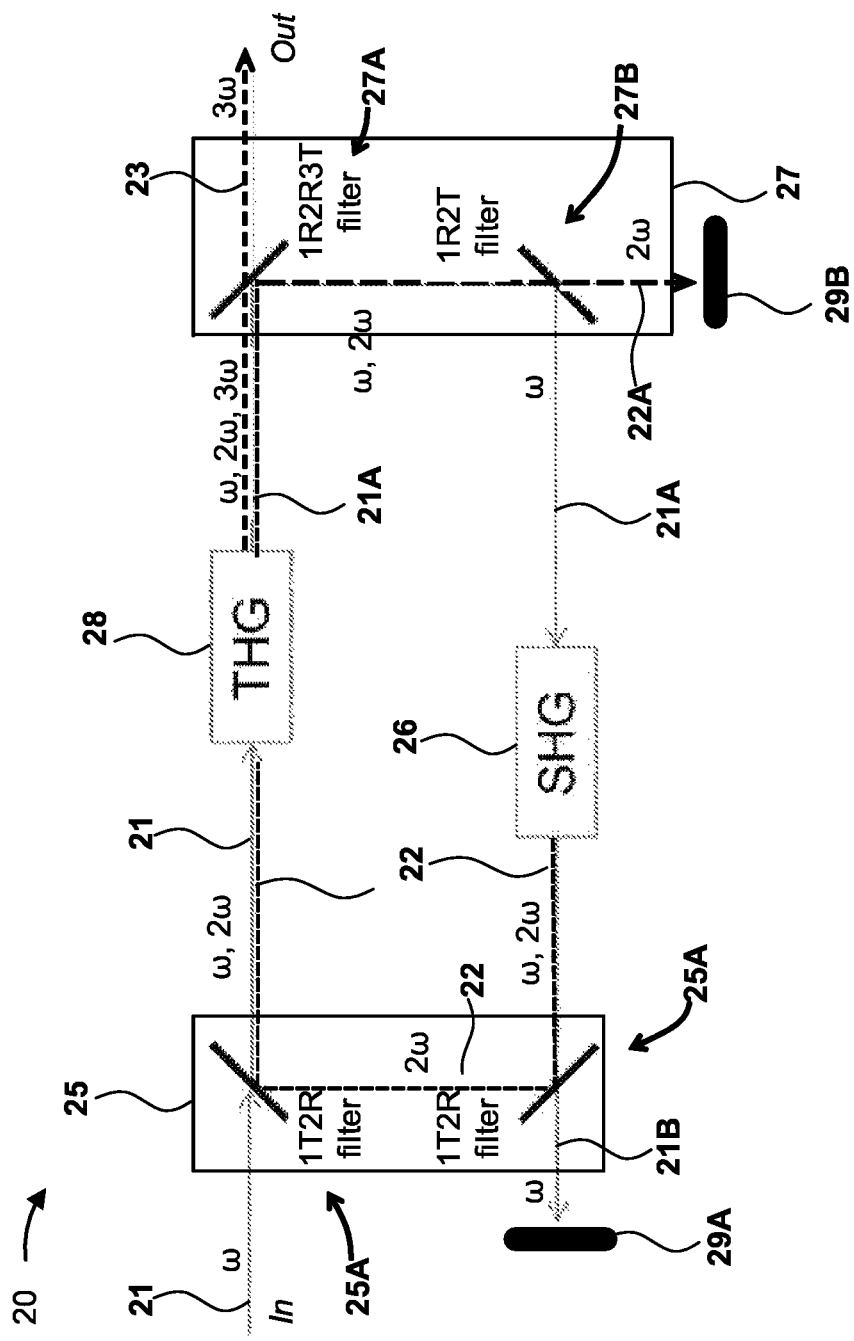
FIG. 2 illustrates a schematic block diagram of a cascaded third harmonic generator of the present disclosure.

Referring to FIG. 2, a third harmonic generator 20 may include: a second harmonic crystal 26 for generating a second harmonic optical beam, a third harmonic crystal 28 for generating a third harmonic optical beam, a first beam combiner 25, and a first beam splitter 27. The first beam combiner 25 may include two dichroic mirrors 25A. The dichroic mirrors 25A are denoted in FIG. 2 with "1T2R filter", which conveniently symbolizes transmitting ("T") a fundamental ("1") optical frequency $\omega$, and reflecting ("R") a doubled ("2") optical frequency $2\omega$. The first beam splitter 27 may include upper 27A and lower 27B dichroic mirrors. Similarly, the upper dichroic mirror 27A is denoted with "1R2R3T filter", which symbolizes reflecting ("R") the fundamental ("1") optical frequency $\omega$; reflecting ("R") the doubled ("2") optical frequency $2\omega$; and transmitting ("T") the tripled ("3") optical frequency $3\omega$. The lower dichroic mirror 27B is denoted with "1R2T filter", which symbolizes reflecting ("R") the fundamental ("1") optical frequency $\omega$, and transmitting ("T") the doubled ("2") optical frequency $2\omega$. The above mirror notation will be followed throughout the rest of the specification and drawings.

In the first beam combiner 25, two similar dichroic mirrors 25A—upper and lower dichroic mirrors 25A—may be used for combining a first fundamental optical beam 21 at the fundamental optical frequency $\omega$ with a second harmonic optical beam 22 at the doubled optical frequency $2\omega$. The third harmonic crystal 28 may be coupled to the upper dichroic mirror 25A of the first beam combiner 25 for generating a third harmonic optical beam 23 at the tripled optical frequency $3\omega$ from the first fundamental optical beam 21 at the fundamental optical frequency $\omega$ and the second harmonic optical beam 22 at the doubled optical frequency $2\omega$. Upon generation of the third harmonic optical beam 23 at the tripled optical frequency $3\omega$, a residual fundamental optical beam 21A at the fundamental optical frequency $\omega$ may exit the third harmonic crystal 28, and be directed, via the upper filter 27A of the first beam splitter 27, to the lower filter 27B of the first beam splitter 27 and further through the second harmonic crystal 26, where the residual fundamental optical beam 21A may be used to generate the second harmonic optical beam 22. A residual beam 21B of the residual fundamental optical beam 21A is directed through the lower dichroic mirror 25A of the first beam combiner 25, where it may be absorbed by an optional optical beam dump 29A (bottom left of FIG. 2). A residual second harmonic beam 22A from the third harmonic crystal 28 at the doubled optical frequency $2\omega$ may be reflected by the upper dichroic mirror 27A to propagate through the lower dichroic mirror 27B to another optional optical beam dump 29B (bottom right of FIG. 2). The second harmonic optical beam 22, to the left of the second harmonic crystal 26, is coupled to the first beam combiner 25 which, as noted at the beginning of this paragraph, may be used for combining the first fundamental optical beam 21 with the second harmonic optical beam 22 for generating the third harmonic optical beam 23.

Figure 3A:
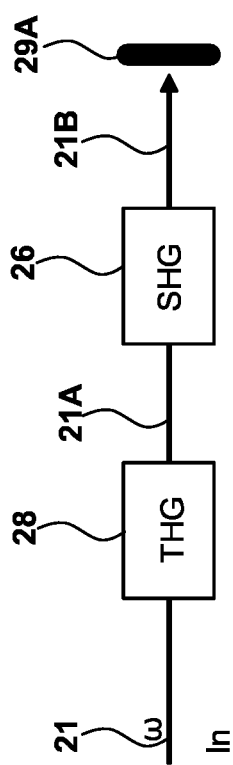
FIGS. 3A to 3C illustrate optical paths of a fundamental optical beam (FIG. 3A); a second harmonic beam (FIG. 3B); and a third harmonic beam (FIG. 3C) of the cascaded harmonic generator of FIG. 2.
Figure 3B:
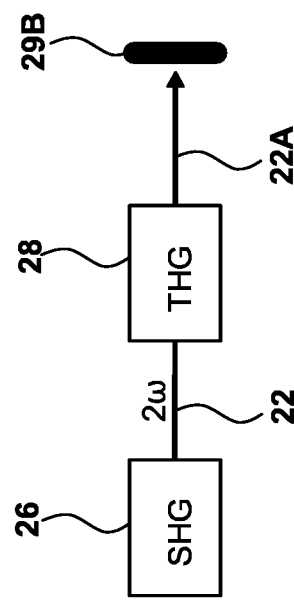
Figure 3C:
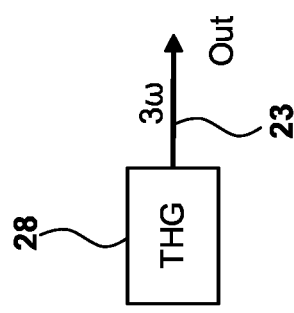

The optical paths of the first fundamental optical beam 21 at the fundamental optical frequency $\omega$, the second harmonic optical beam 22 at the doubled optical frequency $2\omega$, and the third harmonic optical beam 23 at the tripled optical frequency $3\omega$ may be easier tracked by referring to FIGS. 3A-3C. In FIG. 3A, the first fundamental optical beam 21 at the fundamental optical frequency $\omega$ propagates in sequence through the third harmonic crystal 28, then the second harmonic crystal 26 as the residual fundamental optical beam 21A, and then is directed to the left optical beam dump 29A as the residual beam 21B of the residual fundamental optical beam 21A. In FIG. 3B, the second harmonic optical beam 22 at the doubled optical frequency $2\omega$ is generated in the second harmonic crystal 26, propagates through the third harmonic crystal 28, and is directed to the right optical beam dump 29B as the residual second harmonic optical beam 22A. In FIG. 3C, the third harmonic optical beam 23 is generated in the third harmonic crystal 28, and is directed to the output of the third harmonic generator 20.

Figure 1:
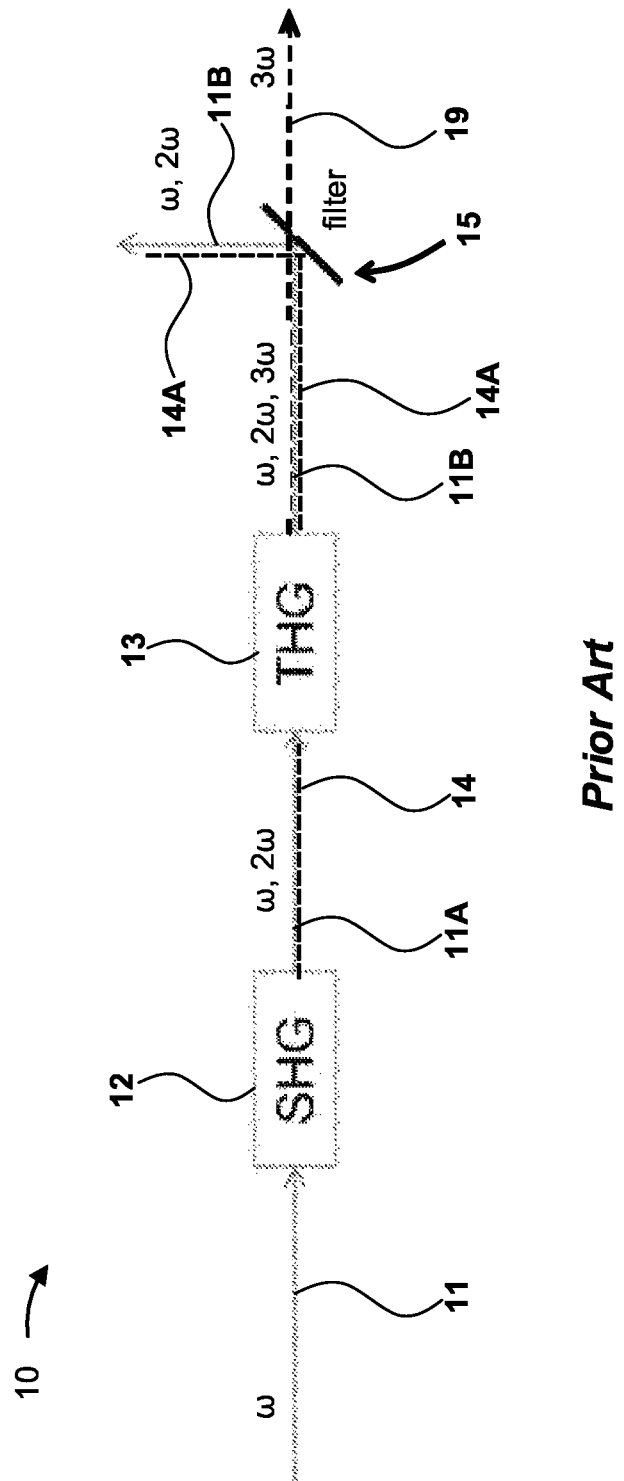
FIG. 1 illustrates a schematic block diagram of a prior-art cascaded harmonic tripler.

Fundamentally, the above-described process may provide a higher efficiency conversion than the prior-art frequency tripler 10 of FIG. 1, at least for the following reason. The third harmonic conversion efficiency depends approximately on the product of the input power densities at the fundamental optical frequency $\omega$ and at the doubled optical frequency $2\omega$. In the prior-art frequency tripler 10 of FIG. 1, the total power input to the third harmonic crystal 13 is limited to the total power input P to the third harmonic generator, because the second harmonic crystal 12 converts some of the input power P at $\omega$ to $2\omega$, but the total power remains substantially unchanged. Typically, the optimal conversion of $\omega$ and $2\omega$ into $3\omega$ may occur when the power at $\omega$ is about 0.4 P and that at $2\omega$ is about 0.6 P, and the product is 0.24 $P^2$. In the third harmonic generator 20 of FIG. 2, the input at the third harmonic crystal 28 consists of 1.0 P at $\omega$ and typically about 0.6 P at $2\omega$, so that the product can be about 0.6 $P^2$, which is 2.5 times higher than in the prior-art third harmonic tripler 10. The total optical power input to the third harmonic crystal 28 is actually greater than P, because much of the power at ω may be used twice: first, in the THG process; and second, in the SHG process. The result is that the power density—and, therefore, the conversion efficiency—may be much higher than in the prior-art third harmonic tripler 10.

Referring momentarily back to FIGS. 3A-3C, the residual fundamental optical beam 21B may be prevented from re-entering the third harmonic crystal 28, for example by using the lower dichroic mirror 25A or by some other suitable filter, to avoid potential optical interference effects. Similarly, the residual second harmonic optical beam 22A may be prevented from re-entering the second harmonic crystal 26, for example by using the lower filter 27B or by some other suitable filter. In other words, the optical paths of the fundamental 21 and second harmonic 22 optical beams may be configured so as not to form a closed loop, i.e. an open loop, at individual optical frequencies, or an optical cavity at an individual optical frequency. Avoiding the closed loop or the optical cavity at individual optical frequencies may facilitate stability of the second and third harmonic generation processes.

The second 26 and third 28 harmonic crystals may include different materials depending on wavelength, power level, or other parameters. Phase matching for SHG and THG may be of many varieties: Type I or Type II, critical or noncritical, collinear or non-collinear. Quasi-phase matching, e.g. using periodically-poled materials, may also be an option. Various kinds of mirrors or optical filters may be used to separate or combine the beams 21, 22, and 23: dichroic or trichroic thin-film filters, polarization filters, absorptive filters, prisms, gratings, or other filters or mirrors. Various orderings and combinations of filters, crystals, mirrors, etc. may be used. Waveplates, non-planar beam paths, or lenses may be included at appropriate locations to provide the desired polarization state or beam size or profile depending on specifics of the conversion configuration. Antireflective coatings or Brewster-angle surfaces may be implemented on the second 26 and third 28 harmonic crystals to reduce power loss due to surface reflections.

One attractive feature of the third harmonic generator 20 of FIG. 2 is that, since the first fundamental optical beam 21 at the fundamental optical frequency ω and the second harmonic optical beam 22 at the doubled optical frequency 2ω are launched separately into the third harmonic crystal 28, the position and angle of the beams 21 and 22 can be optimized for a specific conversion configuration by simple adjustment of the individual dichroic mirrors 25A. Thus, for example, a birefringent or dispersive walk-off plate may not be needed for walk-off compensation. Similarly, for non-collinear phase matching, a prism or other dispersive element may not be needed to create a desired angle between the first fundamental optical beam 21 at the fundamental optical frequency ω and the second harmonic optical beam 22 at the doubled optical frequency 2ω.

Because of the time required for light to travel around a loop formed by the dichroic mirrors 25A, 27A, and 27B and including the second 26 and third 28 harmonic crystals (FIG. 2), the second harmonic optical beam 22 arrives at the third harmonic crystal 28 delayed with respect to the first fundamental optical beam 21. Thus, in general, this configuration may be adaptable for operation with input pulses that are longer in duration than the time required for light to travel around the loop. The typical minimum dimension of such a loop, including second 26 and third 28 harmonic crystals, would be several centimeters, for example 3 cm, corresponding to a minimum useful pulse duration on the order of 100 picoseconds. Thus, the reversed-order harmonic conversion technique described above may be well suited for laser systems generating nanosecond or longer pulses, for example Q-switched solid-state lasers, as well as continuous wave (CW) lasers. Smaller loops addressing picosecond pulses, e.g. from mode-locked lasers, may be built using micro-optics of millimeter or smaller size.

The configuration of the third harmonic generator 20 of FIG. 2 may also be used with multiple pulses, each of which is shorter than the loop round-trip time, if the loop round-trip time is selected to be approximately equal to the pulse separation time, or a multiple of the pulse separation time. In the latter case, the input to the third harmonic crystal 28 includes a new IR pulse and a second harmonic pulse that was generated from an earlier IR pulse. For example, a CW mode-locked laser may continuously deliver pulses of duration about 10 picoseconds or shorter at repetition rates in the range of tens of 1 MHz to 1 GHz. With a 200 MHz mode-locked laser, for example, a reversed-order third harmonic generator, similar to the third harmonic generator 20, with a loop of round-trip time of 5 nanoseconds, corresponding to 150 cm total optical path length, would allow each pulse to be tripled using SHG light from the preceding pulse. This configuration would provide the same benefits of improved conversion efficiency as in the case of a single longer pulse. Even for a pulse burst consisting only of two pulses, there are benefits, since two input pulses are effectively being combined into one THG pulse, a greater output peak power may be generated for a given peak input power.

Figure 4:
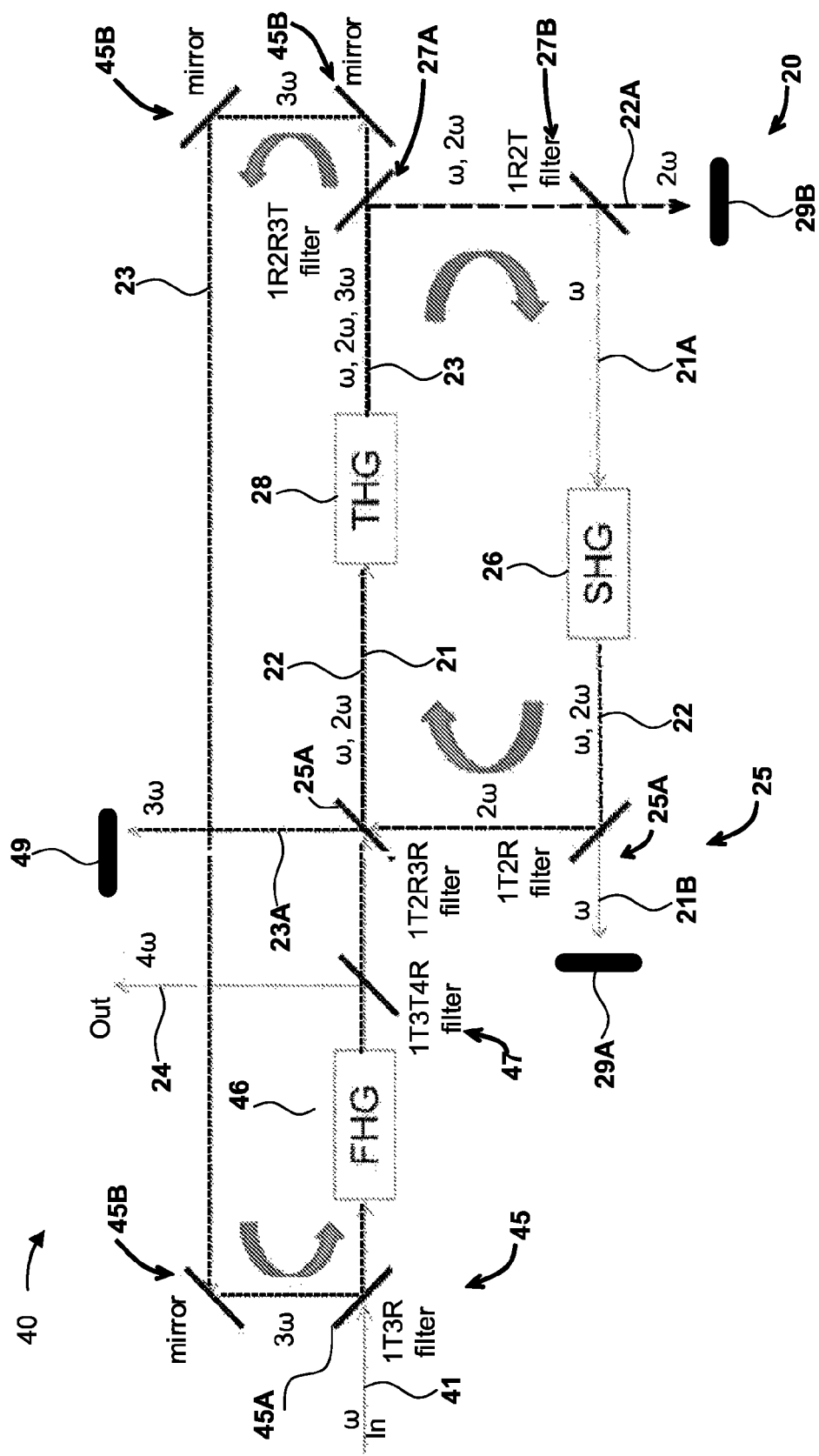
FIG. 4 illustrates a schematic block diagram of a cascaded fourth harmonic generator of the present disclosure, incorporating the cascaded third harmonic generator of FIG. 2.

Referring now to FIG. 4 with further reference to FIG. 2, a fourth harmonic generator 40 may include the third harmonic generator 20 of FIG. 2. A second beam combiner 45, including a dichroic mirror 45A and three turning mirrors 45B, may be provided for combining a second fundamental optical beam 41 with the third harmonic optical beam 23 generated by the third harmonic crystal 28. A fourth harmonic crystal 46 ("FHG" or fourth harmonic generation) may be coupled to the second beam combiner 45, for generating a fourth harmonic optical beam 24, at quadrupled optical frequency 4ω, from the second fundamental optical beam 41 and the third harmonic optical beam 23. Upon generation of the fourth harmonic optical beam 24, the first fundamental optical beam 21 exits the fourth harmonic crystal 46, and a residual beam 23A of the third harmonic optical beam 23 exits the fourth harmonic crystal 46 and may be directed to a top optical beam dump 49 by the upper dichroic mirror 25A, or another suitable splitter. Essentially, in this embodiment the first fundamental optical beam 21 is a residual fundamental optical beam of the second fundamental optical beam 41. Just like in the third harmonic generator 20 of FIG. 2, the first fundamental optical beam 21 is used in the fourth harmonic generator 40 for generating the third harmonic optical beam 23 and the second harmonic optical beam 22. A second harmonic splitter (1T3T4R dichroic mirror) 47 may be coupled to the fourth harmonic crystal 46, for separating the first fundamental optical beam 21 from the fourth harmonic optical beam 24, and for coupling the first fundamental optical beam 21 to the first beam combiner 25 of the third harmonic generator 20.

Figure 5C:
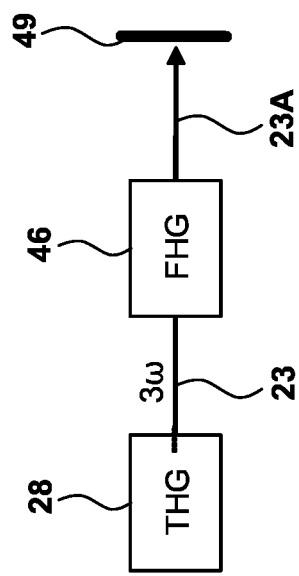
Figure 5D:
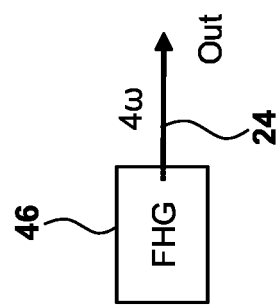

The optical paths of the first 21 and second 41 fundamental optical beams, the second harmonic optical beam 22, and the third harmonic optical beam 23 may be easier traced by referring to FIGS. 5A-5D. In FIG. 5A, the second fundamental optical beam 41 propagates through the fourth harmonic crystal 46. The first fundamental optical beam 21, which is the residual fundamental beam of the second fundamental optical beam 41 as explained above, propagates in sequence through the third harmonic crystal 28, the second harmonic crystal 26 as the residual fundamental optical beam 21A, and may be directed to the left optical beam dump 29A as the residual beam 21B of the residual fundamental optical beam 21A. In FIG. 5B, the second harmonic optical beam 22 is generated in the second harmonic crystal 26, propagates through the third harmonic crystal 28, and is directed to the right optical beam dump 29B as the residual second harmonic optical beam 22A. In FIG. 5C, the third harmonic optical beam 23 is generated in the third harmonic crystal 28, and is directed to the fourth harmonic crystal 46, and is then directed to the top optical beam dump 49 as the residual third harmonic optical beam 23A. Finally, in FIG. 5D, the fourth harmonic beam 24 is generated and is directed to the output of the fourth harmonic generator 40.

Figure 6:
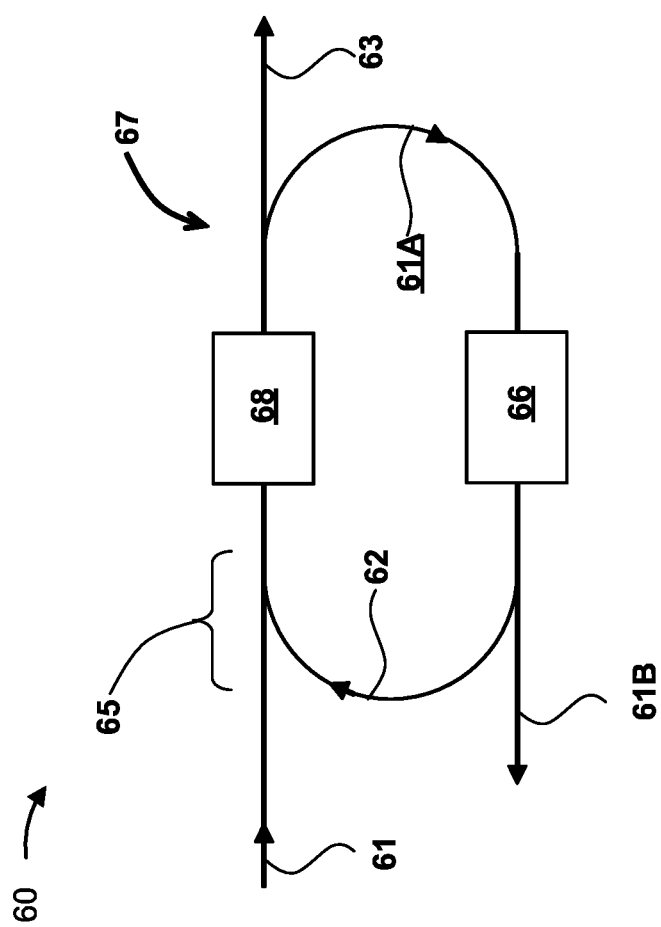
FIG. 6 illustrates a schematic block diagram of a cascaded harmonic generator.

Similar cascaded configurations incorporating one or more reversed-order stages can be implemented for fifth-harmonic generation and beyond. Turning to FIG. 6 with further reference to FIGS. 2 and 4, a cascaded harmonic generator 60 (FIG. 6) for cascaded optical harmonic generation from a main optical beam 61, e.g. the first fundamental optical beam 21 (FIG. 2) or the second fundamental optical beam 41 (FIG. 4), may include a "higher harmonic generator" 68 disposed in a path of the main optical beam 61 for generating a "higher harmonic optical beam" 63. A "lower harmonic generator" 66 may be disposed in the path of the main optical beam 61, that is, in a path of a residual main optical beam 61A, downstream of the higher harmonic generator 68, for generating a "lower harmonic optical beam" 62 from the residual main optical beam 61A. The "higher" 68 and "lower" 66 harmonic generators may be, for example, the third 28 and second 26 harmonic crystals, respectively, in the third harmonic generator 20 of FIG. 2. Another example may include the fourth harmonic crystal 46 of the fourth harmonic generator 40 of FIG. 4 as the "higher harmonic generator" 68, and the entire third harmonic generator 20 as the "lower harmonic generator" 66.

A harmonic separator 67 may be disposed in the path of the main optical beam 61 between the higher 68 and lower 66 harmonic generators, for splitting the higher harmonic optical beam 63 from the residual main optical beam 61A propagated through the higher harmonic generator 68. A harmonic combiner 65 may be disposed in the path of a residual beam 61B of the residual main optical beam 61A downstream of the lower harmonic generator 66, for coupling the lower harmonic optical beam 62 generated by the lower harmonic generator 66, and the main optical beam 61, to the higher harmonic generator 68 for generating the higher harmonic optical beam 63, while optionally disposing of the residual beam 61B, as shown in FIG. 6. Thus, the beam combiners 25, 45 and/or the harmonic splitter 47 may be configured so that a path of the main optical beam 61 or the lower harmonic optical beam 62 in the cascaded harmonic generator 60 is absent an optical closed loop, to avoid instability due to positive optical feedback.

Figure 7:
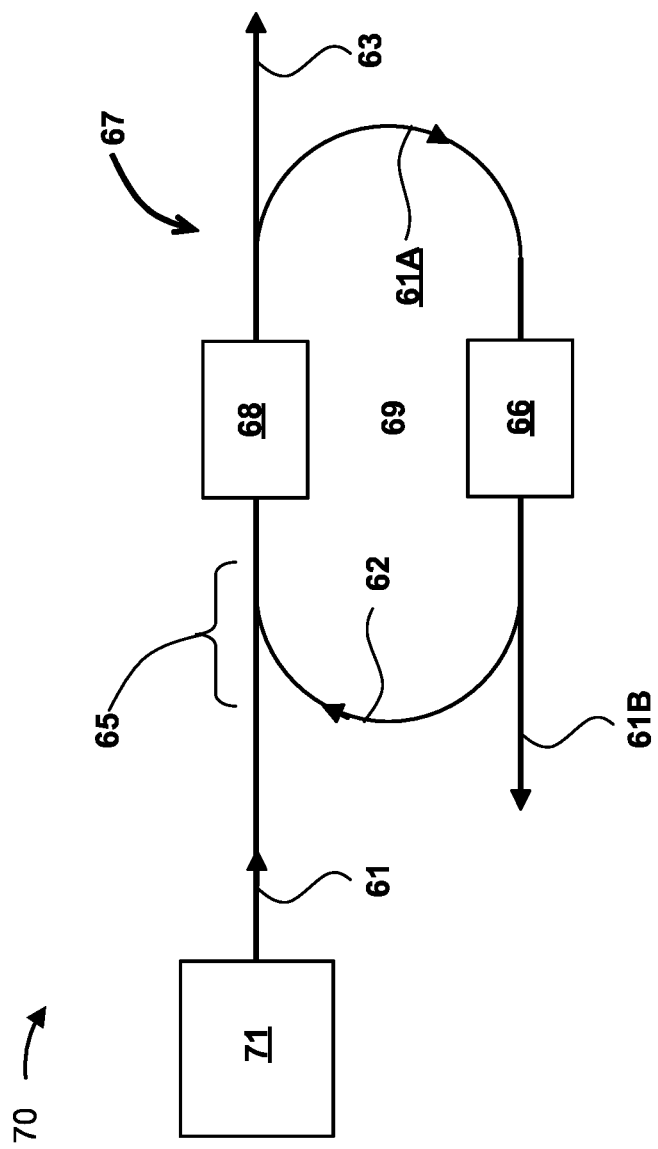
FIG. 7 illustrates a schematic block diagram of the cascaded harmonic generator of FIG. 6, including a pulsed source of fundamental light.

Referring now to FIG. 7 with further reference to FIG. 6, a cascaded harmonic generator 70 includes the cascaded harmonic generator 60 of FIG. 6 and a pulsed light source 71 for providing the main optical beam 61. Similarly to the case of the third harmonic generator 20 of FIG. 2, the main optical beam 61 of the cascaded harmonic generator 60 may be pulsed such that a light round-trip time in an optical loop 69, including the lower 66 and higher 68 harmonic generators, is substantially an integer multiple of the pulse separation time.

Figure 8:
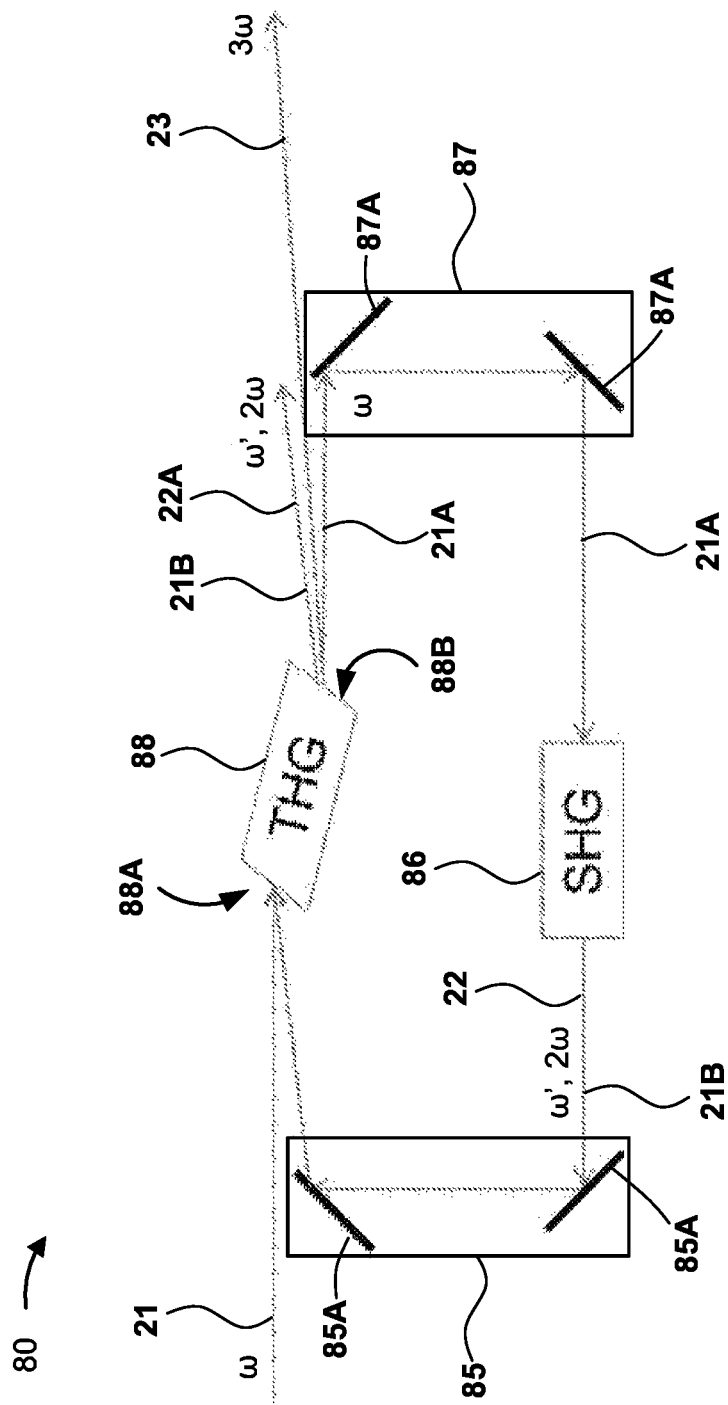
FIG. 8 illustrates a schematic block diagram of an embodiment of a cascaded third harmonic generator using a slanted third harmonic crystal.

Turning now to FIG. 8 with further reference to FIGS. 2 and 6, a third harmonic generator 80 is a variant of the third harmonic generator 20 of FIG. 2, and may be viewed as an example of the cascaded harmonic generator 60 of FIG. 6. The third harmonic generator 80 of FIG. 8 may include a second harmonic crystal 86 as the lower harmonic generator 66, and a third harmonic crystal 88 as the higher harmonic generator 68. One distinct feature of the third harmonic generator 80 of FIG. 8 is that the third harmonic crystal 88 may include input 88A and output 88B optical faces slanted relative to the input of the fundamental optical beam 21, preferably at Brewster angle. Another feature is that a first beam combiner 85 may include upper and lower turning mirrors 85A, and a first beam splitter 87 may include upper and lower turning mirrors 87A. The upper and lower turning mirrors 85A, 87A do not have to be dichroic mirrors, that is, the upper and lower turning mirrors 85A, 87A may be regular mirrors, where beam combining and splitting functions are provided by spatial multiplexing, i.e. one beam is reflected by the mirror whereas a second beam bypasses the mirror spatially. Alternatively, the beam combining and splitting function can be provided by polarization multiplexing, where the beams are of differing polarizations, and the mirror transmits one polarization and reflects the other.

The third harmonic crystal 88 is preferably oriented such that the first fundamental optical beam 21 and the second harmonic optical beam 22 impinge on the input optical face 88A of the third harmonic crystal 88 at a non-normal (acute) angle of incidence. Furthermore, the first fundamental optical beam 21 and the second harmonic optical beam 22 may form a nonzero (acute) angle with respect to each other. The first fundamental optical beam 21 may be polarized in the plane of FIG. 8. The SHG in the second harmonic crystal 26 may be Type I, generating the second harmonic optical beam 22 at the doubled frequency $2\omega$ polarized perpendicular to FIG. 8. The THG in the third harmonic crystal 88 may be Type II, combining the first fundamental optical beam 21 polarized in the plane and the second harmonic optical beam 22 polarized perpendicular to the plane of FIG. 8, to generate the third harmonic optical beam 23 at the tripled frequency $3\omega$ polarized in the plane of FIG. 8.

For micrometer wavelength range and a peak input power of greater than about 1 kW, the second harmonic crystal 86 (FIG. 8) may be lithium barium borate (LBO) with preferably non-critical phase matching at about 150° C., and the third harmonic crystal 88 (FIG. 8) may be LBO with critical and either collinear or non-collinear phase matching polarized perpendicular to FIG. 8. Because the third harmonic crystal 88 has Brewster angles of incidence and exit, spectral dispersion, that is, wavelength dependence of refractive index, of the third harmonic crystal 88 may provide an angular separation of the optical beams at the input 88A and output 88B faces of the third harmonic crystal 88.

One benefit of this configuration is that no waveplates or dichroic mirrors may be required to separate residual output beams 21B and 22A from third harmonic optical beam 23, and to rotate polarization. Indeed, the upper turning mirror 85A of the first beam combiner 85 may couple the second harmonic optical beam 22 and the residual optical beam 21B to the third harmonic crystal 88. The upper turning mirror 87A of the first beam splitter 87A may split off the residual fundamental optical beam 21A. When the first fundamental optical beam 21 and the second harmonic optical beam 22 have different angles of incidence on the input face 88A of the third harmonic crystal 88, the first fundamental optical beam 21 and the second harmonic optical beam 22 may be substantially collinear within the third harmonic crystal 88. In the example of Type II LBO THG length in the 1 mm range, the angular separation of the beams 21 and 22 is on the order of 1°-3°, which may suffice for straightforward beam separation using mirror edges or beam blocks. The use of Brewster surfaces may be beneficial, because no anti-reflection (AR) coating may be needed on the output face 88B of the third harmonic crystal 88, as both the residual fundamental optical beam 21A and the third harmonic optical beam 23 are p-polarized for low-loss Brewster transmission. Together with the increased surface area of the faces 88A, 88B relative to a normal-incidence face, this significantly improves the UV-damage resistance of the faces 88A, 88B. The input face 88A may preferably be AR-coated for s-polarized second harmonic beam 22 and p-polarized first fundamental optical beam 21. Another benefit of this configuration is that the residual beam 21B at the fundamental frequency $\omega$, needs not be immediately dumped, as it will be collinear with the second harmonic beam 22 and, therefore, not collinear with the first fundamental optical beam 21 within the third harmonic crystal 88, so it will likely not interfere with the THG process and will exit collinearly with the residual second harmonic beam 22A, whereupon both can be separated from the third harmonic optical beam 23 and ejected in one common optical beam dump, not shown. As in FIG. 2, lenses or other optics may be added to generate appropriate beam sizes and spatial profiles at the crystals.

Figure 9A:
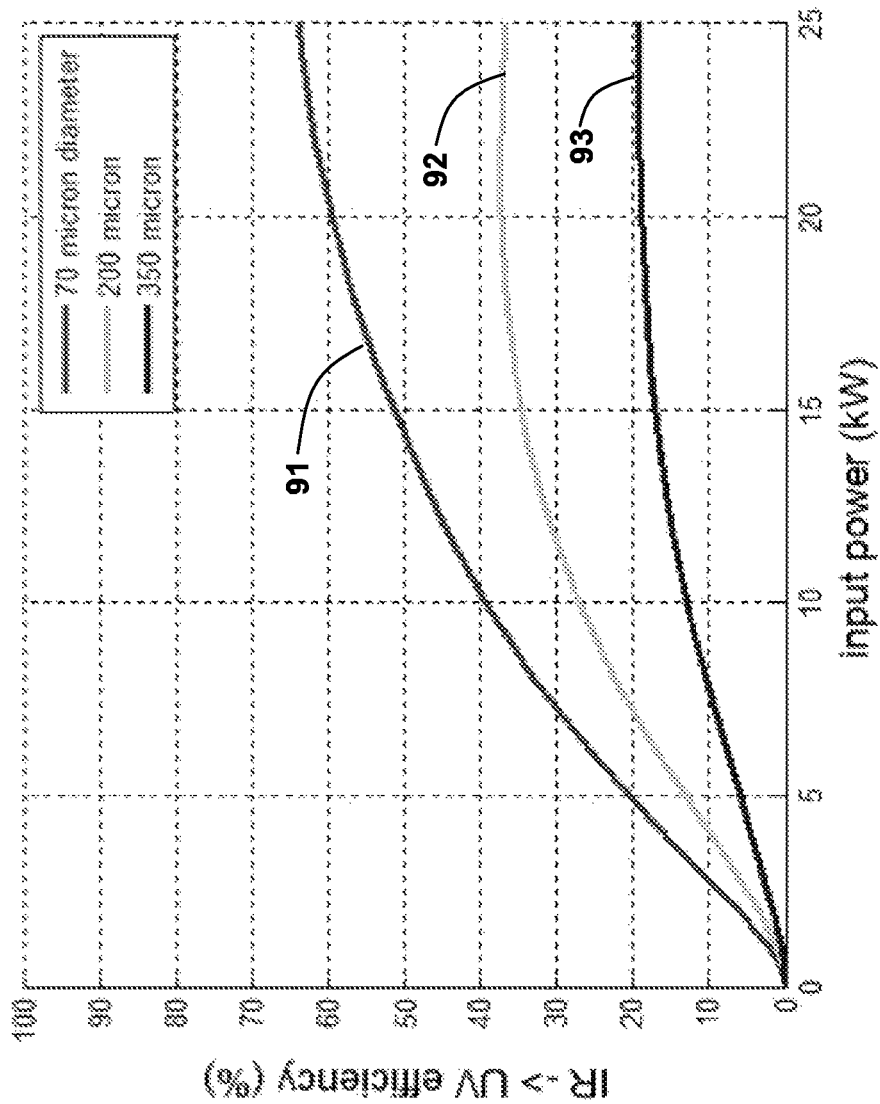
FIG. 9A illustrates a computed conversion efficiency diagram of the frequency tripler of FIG. 1.
Figure 9B:
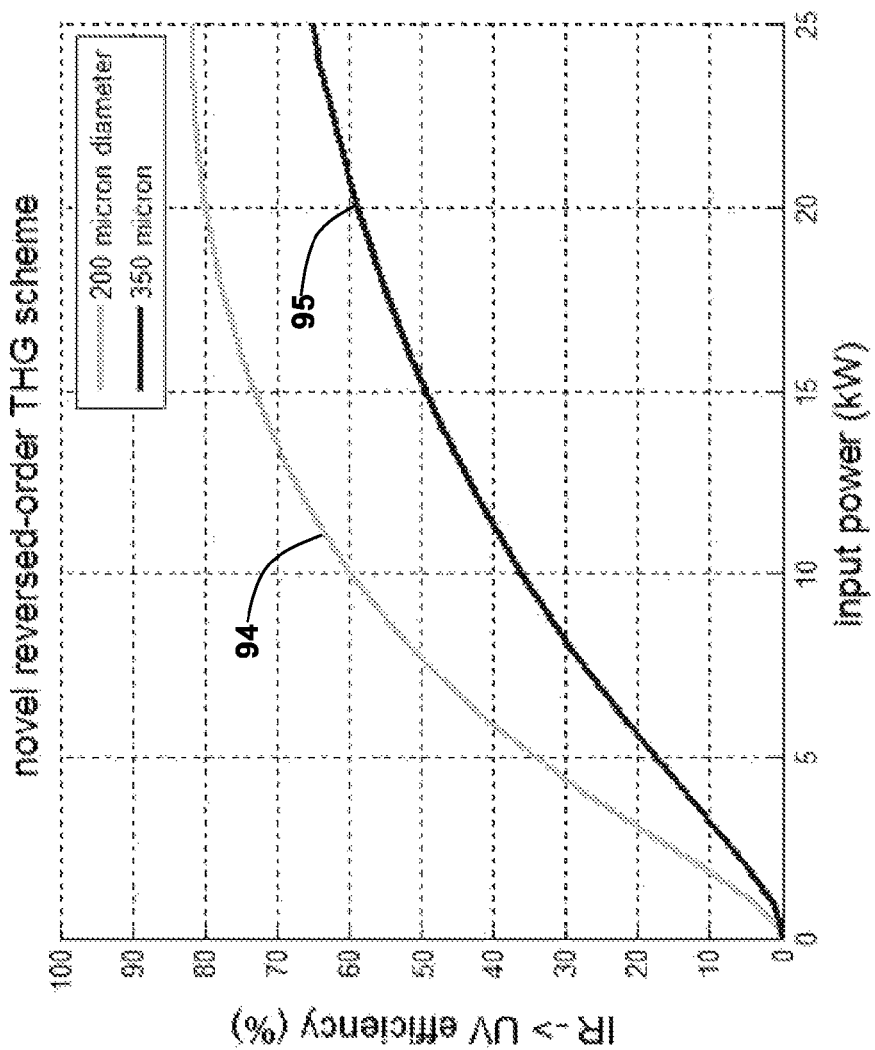
FIG. 9B illustrates a computed conversion efficiency diagram of the third harmonic cascaded generator of FIG. 2, for comparison with FIG. 9A.

Referring to FIGS. 9A and 9B with further reference to FIGS. 1 and 2, calculated optical conversion efficiency of the third harmonic generator 20 of FIG. 2 (FIG. 9B) is compared to that of the conventional optical frequency tripler 10 of FIG. 1 (FIG. 9A). In both FIGS. 9A and 9B, the optical conversion efficiency is plotted as a function of input optical power in kW, up to 25 kW input optical power level.

Referring specifically to FIG. 9A with further reference to FIG. 1, the optical conversion efficiency is plotted for 70 micrometer second harmonic beam 14 diameter (91); 200 micrometer second harmonic beam 14 diameter (92); and 350 micrometer second harmonic beam 14 diameter (93). The input wavelength is 1064 nm, and the pulse durations are typically tens of nanoseconds. Both SHG 12 and THG 13 crystals are LBO. The second harmonic crystal 12 is 15 mm long, with Type I non-critical phase matching at about 150° C. with a 140 micrometer diameter spot of the fundamental beam 11. The third harmonic crystal 13 is 20 mm long, and the phase matching is Type II critical, non-collinear phase matching. A highest conversion efficiency 91 corresponds to the spot diameter of the second harmonic beam 14 of 70 micrometer, which may provide the best conversion at 20 kW input power. Middle 92 and bottom 93 conversion efficiencies correspond to the spot diameters of the second harmonic beam 14 of 200 micrometer and 350 micrometer, respectively. These spot diameters result in the efficiencies 92 and 93, which are traded off for larger spot size and therefore improved beam quality and crystals 12 and 13 lifetime. At 25 kW input power level to the prior-art frequency tripler 10, the 70 micrometer input spot size results in 63% conversion efficiency 91; the 200 micrometer spot size results in 37% conversion efficiency 92; and the 350 micrometer spot size results in just below 20% conversion efficiency 93.

Turning now specifically to FIG. 9B with further reference to FIG. 2, a highest optical conversion efficiency 94 corresponds to 200 micrometer beam diameter of the second harmonic beam 22 in the optical harmonic generator 20 of FIG. 2. A second highest conversion efficiency 95 corresponds to and 350 micrometer beam diameter of the second harmonic beam 22 in the optical harmonic generator 20 of FIG. 2.

The comparison of FIGS. 9A and 9B reveals a much higher conversion efficiency of the optical harmonic generator 20 of FIG. 2, as compared with the prior-art optical frequency tripler 10 of FIG. 1. For instance, at 25 kW input power level to the third harmonic generator 20 of FIG. 2, the 200 micrometer spot size results in 81% conversion efficiency; and the 350 micrometer spot size results in 65% conversion efficiency. Therefore, the third harmonic generator 20 of the present disclosure may provide a higher conversion efficiency at 200 micrometer second harmonic beam 22 diameter than the traditional frequency tripler 10 at 70 micrometer second harmonic beam 14 diameter.

Figure 10:
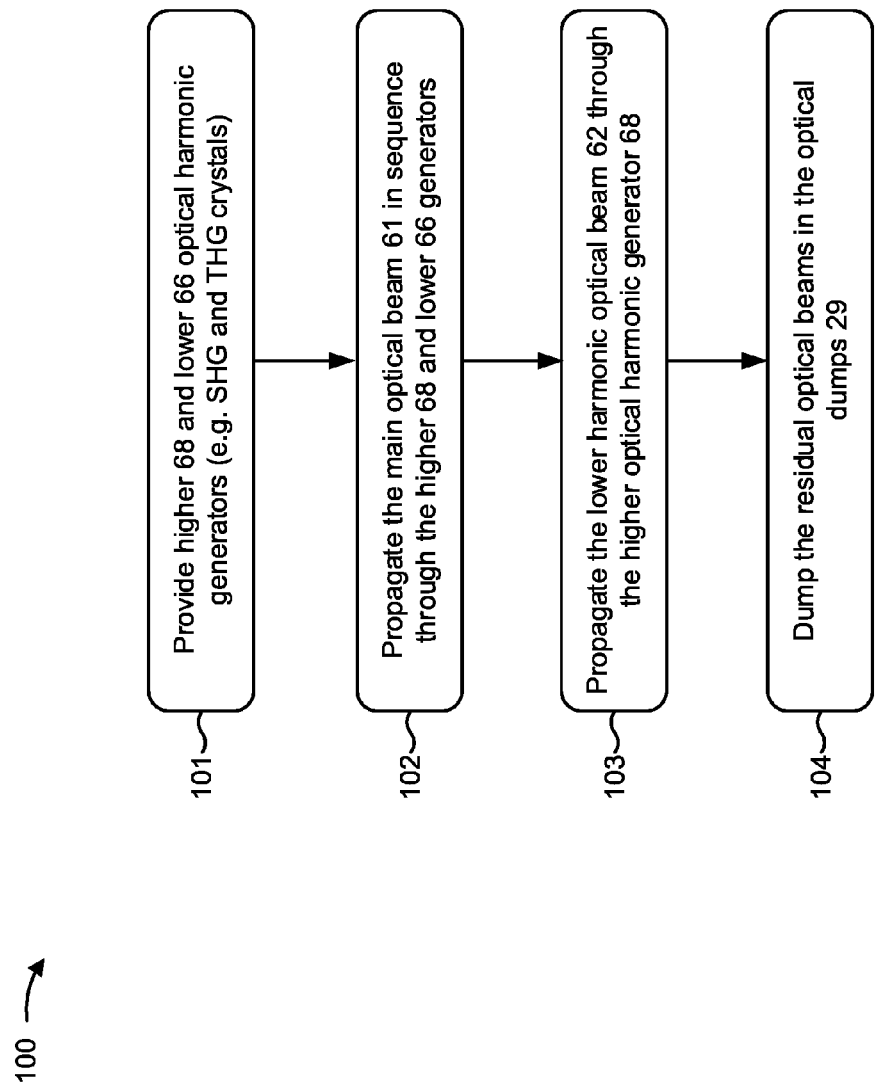
FIGS. 10 and 11 illustrate flow charts of embodiments of a method of cascaded optical harmonic generation according to the present disclosure.

Referring to FIG. 10 with further reference to FIGS. 2 and 6, a method 100 (FIG. 10) of cascaded optical harmonic generation from the main optical beam 61 (FIG. 6) may include a step 101 of providing the lower optical harmonic generator 66 for generating the lower harmonic optical beam 62, and the higher optical harmonic generator 68 for generating the higher harmonic optical beam 63. In a next step 102, the main optical beam 61 may be propagated in sequence through the higher harmonic generator 68; and then through the lower harmonic generator 66, so as to generate the lower harmonic optical beam 62 by propagating through the lower harmonic generator 66, such that the lower harmonic optical beam 62 overlaps with the main optical beam 61 in the lower harmonic generator 66. In a next step 103, the lower harmonic optical beam 62 generated by the lower harmonic generator 66 is propagated through the higher harmonic generator 68, such that the lower harmonic optical beam 62 overlaps with the main optical beam 61 in the higher harmonic generator 68, so as to generate the higher harmonic optical beam 63. Further, in an optional step 104, the residual main optical beam 62A exiting the lower harmonic generator 66, and/or other residual beams, may be separated from the lower harmonic optical beam and dumped in the optical dumps 29A, 29B.

Similarly to the optical harmonic generator 80 of FIG. 8, the lower harmonic optical beam 62 impinging on the higher harmonic generator 68 may form an acute angle with the main optical beam 61 impinging on the higher harmonic generator 68, for collinear propagation in the higher harmonic generator 68. Furthermore, the main optical beam may be pulsed such that a light round-trip time in an optical loop 69, including the lower 66 and higher 68 harmonic generators, is substantially an integer multiple of the pulse separation time.

Figure 11:
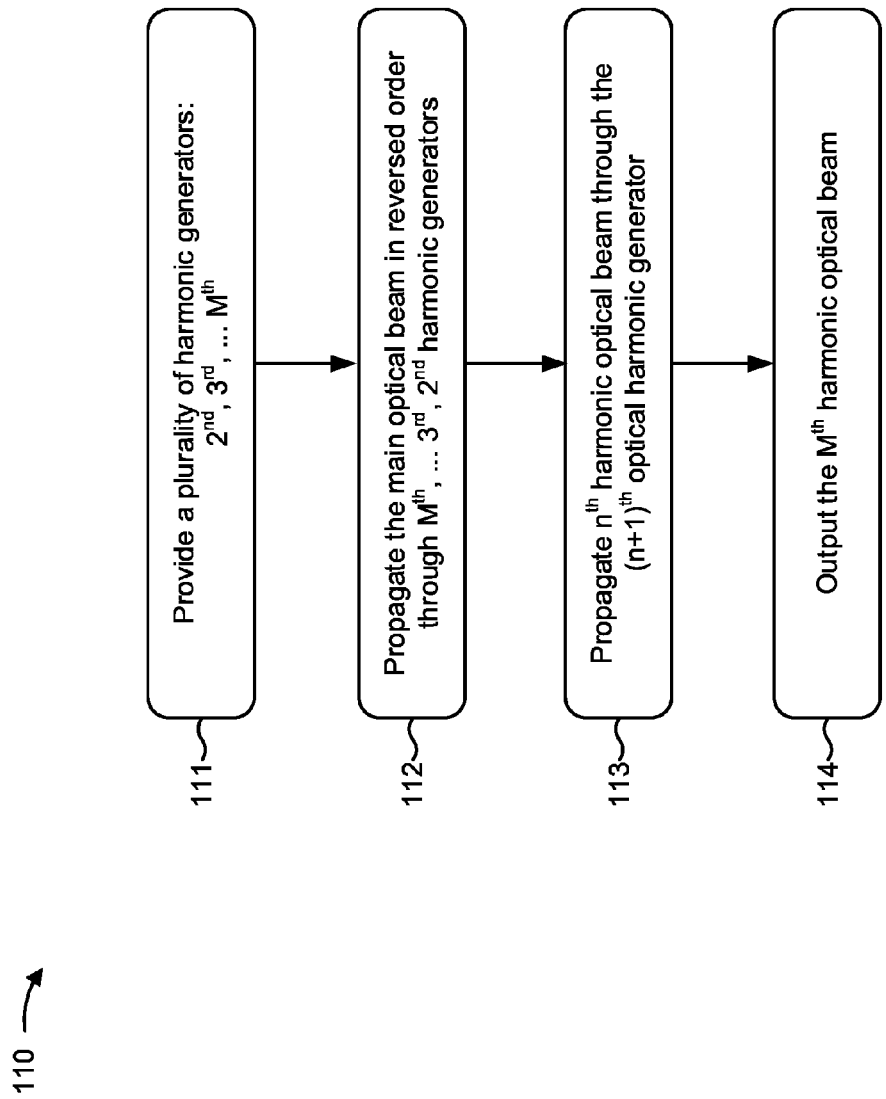

The method 100 of FIG. 10 may be generalized for higher order cascaded higher harmonic generation, for example the fourth harmonic (FIG. 4), fifth harmonic generation, and so on. Turning to FIG. 11, a method 110 of cascaded optical harmonic generation from a main optical beam includes a step 111 of providing a plurality of harmonic generators including at least one $m^{th}$ harmonic generator, where m=2, ..., M, and M is an integer ≥3. In a next step 112, the main optical beam may be propagated through the plurality of harmonic generators in the order of decreasing number m, starting from the $M^{th}$ harmonic generator and ending with the second harmonic generator. By way of illustration, referring momentarily back to FIG. 5A, the fourth harmonic optical beam 41 is propagated through the fourth harmonic crystal 46, the third harmonic crystal 28, and the second harmonic crystal 26.

In a next step 113, each $n^{th}$ harmonic optical beam may be propagated through the $(n+1)^{th}$ harmonic generator, so as to overlap therein with the main optical beam, where n= 2, ..., M−1. For example, referring back to FIGS. 5B and 5C, the second harmonic optical beam 22 is propagated through the third harmonic crystal 28 (FIG. 5B), and the third harmonic optical beam 23 is propagated through the fourth harmonic crystal 46 (FIG. 5C). Finally, in a step 114, the $M^{th}$ harmonic optical beam is outputted. By way of example, referring back to FIG. 5D, the fourth harmonic beam 24 may be outputted from the fourth harmonic crystal 46. In one embodiment, the main optical beam is propagated so that an optical path of the main optical beam does not form a closed optical loop, i.e. it is open looped.

In some implementations, the delay time of a cascaded harmonic generator (herein referred to as harmonic generator delay time) may be designed to be approximately equal to, or an approximate integer multiple of, a round-trip time of a laser source (herein referred to as a laser source round-trip time). For example, the delay time of third harmonic generator 20 may be designed such that the delay time is approximately equal to, or is an integer multiple of, a laser source round-trip time of a laser source that provides the first fundamental optical beam 21. Notably, while the below techniques associated with the delay time design are described in the context of third harmonic generator 20 and a laser source of the first fundamental optical beam 21, these techniques may equally apply to fourth harmonic generator 40, cascaded harmonic generator 60, cascaded harmonic generator 70, third harmonic generator 80, and their respective laser sources.

The delay time of a harmonic generator may be defined as an amount of time for a beam to travel through the harmonic generator. The delay time may also be considered as the optical path length traveled by the beam in the harmonic generator. The optical path length traveled is related to the physical separation of the components of the third harmonic generator 20 and the refractive indices of the materials through which the beam passes. A round-trip time is a more specific case for a delay time where a start point and an end point are the same point. Using FIG. 2 as an example, a round-trip time for a beam through third harmonic generator 20 may be defined as an amount of time from a time when a beam 21 passes through upper 1T2R filter 25A to a time at which second-harmonic optical beam 22, originating from that beam 21, reaches the same upper 1T2R filter 25A. Other points in the optical path where second-harmonic optical beam 22 (or 22A) overlaps fundamental optical beam 21 (or 21A) may be used to define the round-trip time for a beam in the system.

The laser source round-trip time may be defined as an amount of time for a beam of light to traverse a cavity of the laser source fully, so as to end up traveling in the same direction as at the outset. For example, in a linear cavity, the laser source round-trip time would be an amount of time for a beam to travel from a particular point within the cavity, reflect from one cavity end mirror, reflect from the other cavity end mirror, and travel back to the same particular point within the cavity, in the process also twice traversing the laser gain medium or media. In a typical case, fluctuations of the laser source approximately repeat on successive round-trips associated with the laser source.

In some implementations, the laser source of the first fundamental optical beam 21 may operate with multiple longitudinal modes. In such a case, power of the laser source may fluctuate due to mode beating. Generally, for a solid-state laser source, such fluctuations occur on a picosecond timescale and, on the picosecond timescale, the power output may vary from near zero to multiple times an average power output. Since a laser source round-trip time may be several nanoseconds, there may be thousands of fluctuations during a given round-trip of the laser source, causing noise to be introduced into the optical beam output by the laser source.

The standard non-linear conversion scheme (e.g., as described in connection with prior-art cascaded harmonic tripler 10 of FIG. 1) may benefit from these fluctuations, particularly in the low conversion limit. For example, high-power fluctuations of the fundamental light beam 11 convert strongly to the second harmonic beam 14, and the fluctuations in the high-power fundamental light beam 11 and the high-power second harmonic beam 14 convert strongly to the third harmonic beam 19. Here, the fundamental light beam 11 and the second harmonic beam 14 entering the third harmonic crystal 13 have synchronized (i.e., temporally aligned) fluctuations since the second harmonic beam 14 originates from the same fundamental light beam 11 as that with which the second harmonic beam 14 is mixed in the third harmonic crystal 13. The fluctuations of the fundamental light beam 11 and second harmonic beam 14 are synchronized because the fundamental light beam 11 generates the second harmonic beam 14 in the second harmonic generator 12, and they travel the same optical path and they collectively enter the third harmonic generator 13. The non-linear nature of this coupling implies that an average power conversion is increased more by the high-power fluctuations than the average power conversion is decreased by relatively low-power fluctuations.

In the reversed-order scheme described, for example, in connection with third harmonic generator 20 of FIG. 2, the third harmonic crystal 28 generates the third harmonic optical beam 23 based on a combination of the first fundamental optical beam 21 and the second harmonic optical beam 22 that is received from 1T2R filter 25A. Here, since the second harmonic optical beam 22 travels a different optical path from the fundamental optical beam 21 prior to entering the third harmonic crystal 28, fluctuations in the first fundamental optical beam 21 and fluctuations in the second harmonic optical beam 22 may not be synchronized (i.e., may be temporally misaligned) when entering the third harmonic crystal 28, which prevents enhancement of power conversion from the fluctuations. In other words, the third harmonic generator 28 receives the first fundamental optical beam 21 directly from the laser source, and receives second harmonic optical beam 22 generated from the second harmonic crystal 26. Accordingly, it is possible that the fundamental optical beam 21 and the second harmonic beam 22 received by the third harmonic generator 28 may be unsynchronized, which may reduce generation of the third harmonic beam 23.

However, as noted above, the fluctuations of the laser source approximately repeat on successive round-trips associated with the laser source. Here, while a gradual change of a waveform of the fluctuations may exist (e.g., on a timescale from tens to hundreds of round-trips), a change in the waveform of the fluctuations from one laser source round-trip (e.g., a first round-trip) to a temporally close round-trip (e.g., a second round-trip, a third round-trip, or a fourth round-trip) is small, which causes the waveforms to be nearly periodic. It follows that the power conversion enhancement may be obtained by designing the delay time of the third harmonic generator 20 (e.g., $T_{HG}$) to be approximately equal to, or an approximate integer multiple of, the laser source round-trip time (e.g., $T_{source}$). Here, while the first fundamental optical beam 21 and the second harmonic optical beam 22 may not be exactly aligned when entering the third harmonic crystal 28, the fluctuations may be approximately synchronized due to the near-periodic nature of the fluctuation waveform.

Figure 12A:
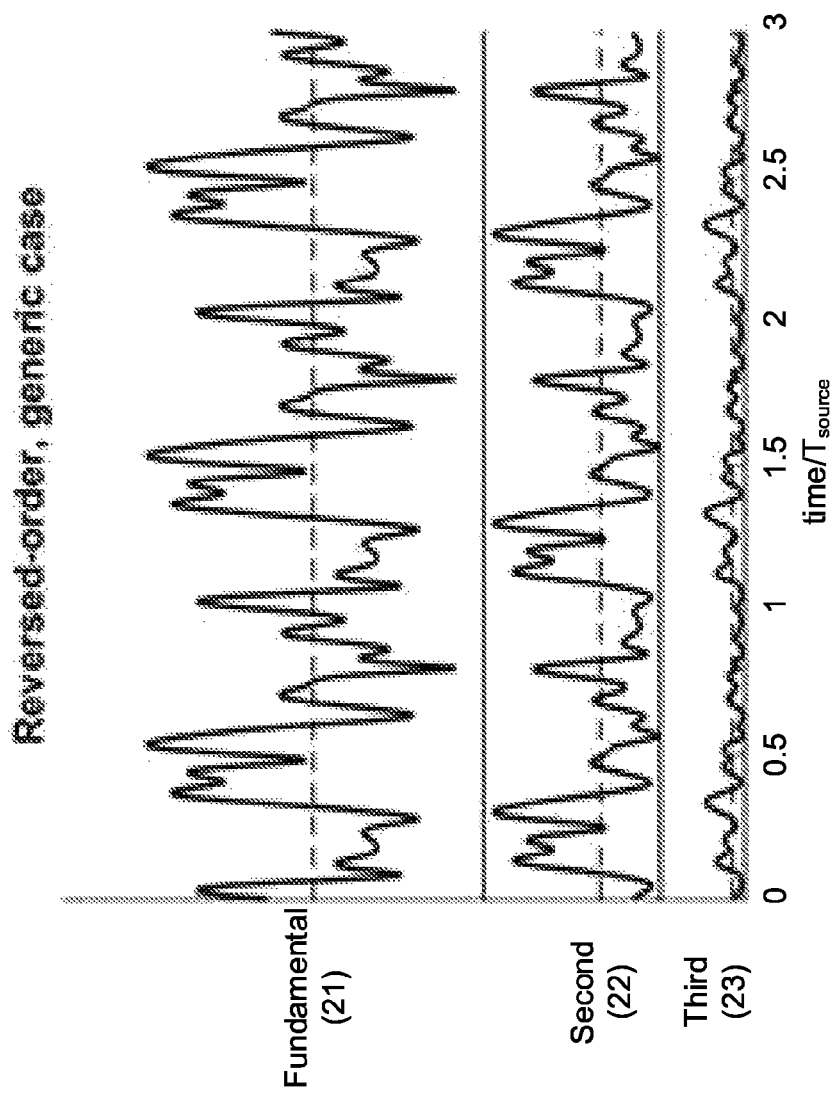
FIG. 12A is a graphical representation showing an example of unaligned waveforms of optical signals for a cascaded optical harmonic generator with a delay time that is not approximately equal to, and is not an approximate integer multiple of, a round-trip time of a laser source.
Figure 12B:
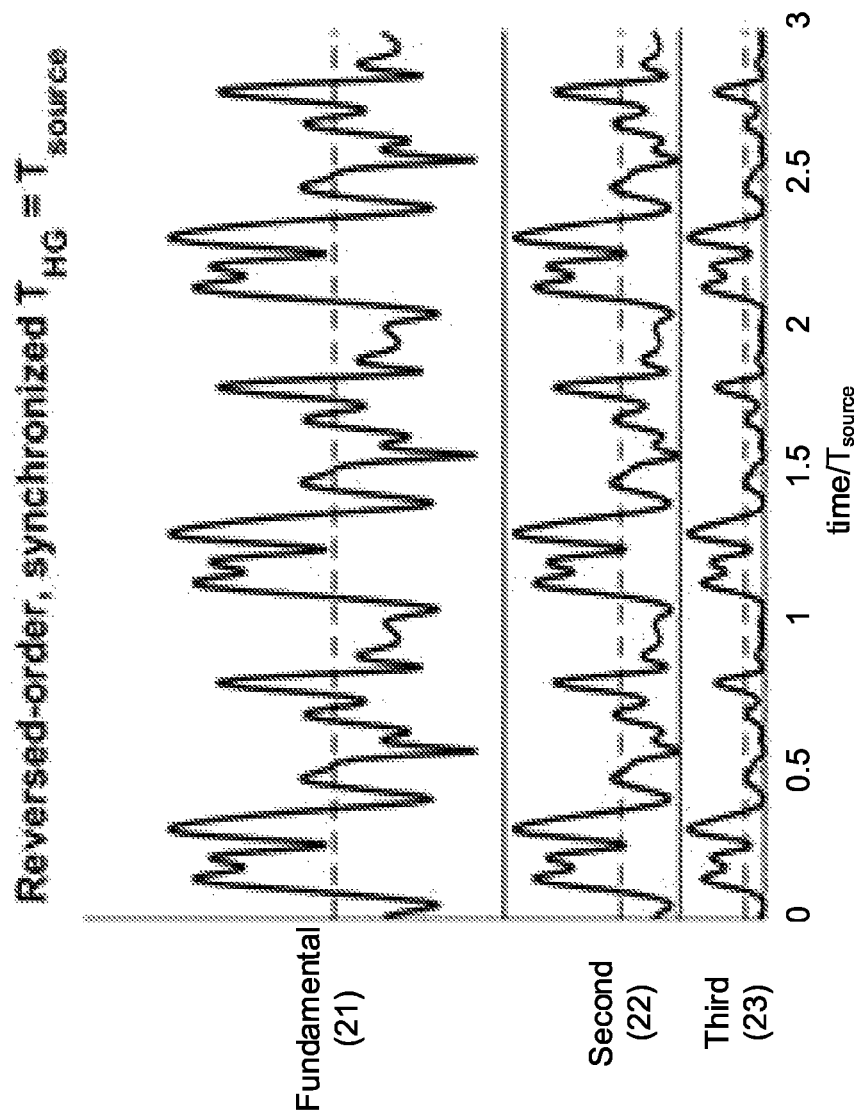
FIG. 12B is a graphical representation showing an example of aligned waveforms of optical signals for a cascaded optical harmonic generator with a delay time that is approximately equal to, or is an approximate integer multiple of, a round-trip time of a laser source.

FIG. 12A is a graphical representation showing an example of temporally misaligned waveforms of optical signals for a cascaded optical harmonic generator with a delay time that is not approximately equal to, and is not an approximate integer multiple of, a laser source round-trip time. Conversely, FIG. 12B is a graphical representation showing an example of aligned waveforms of optical signals for a cascaded optical harmonic generator with a delay time that is approximately equal to, or is an approximate integer multiple of, a laser source round-trip time. The vertical scales in FIGS. 12A and 12B are identical in magnitude. As shown in FIGS. 12A and 12B, waveforms of fluctuations of the first fundamental optical beam 21, the second harmonic optical beam 22, and the third harmonic optical beam 23 may be noisy, but nearly periodic (e.g., within three example periods shown in FIGS. 12A and 12B).

As shown in FIG. 12A, in the misaligned case (e.g., when THG is not approximately equal to, and is not an approximate integer multiple of, $T_{source}$), the fluctuations in the second harmonic optical beam 22 may be misaligned from the fluctuations in the first fundamental optical beam 21, causing the third harmonic optical beam 23 (e.g., created using the first fundamental optical beam 21 and the second harmonic optical beam 22) to have a relatively low average power (e.g., as compared to the aligned case described below), as indicated by the lowest dotted line within FIG. 12A.

However, as shown in FIG. 12B, in the aligned case (e.g., when THG is approximately equal to, or is an approximate integer multiple of, $T_{source}$), the fluctuations in the second harmonic optical beam 22 and the fluctuations in the first fundamental optical beam 21 may be displaced from each other by one or more periods of the fluctuation. In other words, the fluctuations in the second harmonic optical beam 22 may be approximately aligned (i.e., synchronized) with the fluctuations in the first fundamental optical beam 21. As a result, the third harmonic optical beam 23 may include peaks where positive fluctuations occur, leading to a higher average output power (e.g., as compared to the unaligned case described above), as indicated by the lowest dotted line in FIG. 12B.

Notably, a comparison of FIGS. 12A and 12B indicates a shift of the fluctuations in the first fundamental optical beam 21 in order to align with the fluctuations in the second harmonic optical beam 22 such that the third harmonic optical beam 23 has a relatively higher average power. However, in practice, and using the techniques described herein, the fluctuations in the second harmonic optical beam 22 are shifted in order to align with the fluctuations in the fundamental optical beam 21 such that the third harmonic optical beam 23 has a relatively higher average power. In other words, the delay time of the third harmonic generator 20 is designed in order to align the fluctuations in the second optical beam 22 with the fluctuations in the first fundamental optical beam 21. FIG. 12B is merely an example meant to show that, due to the design of the delay time, the third harmonic optical beam 23 may maintain a waveform similar to that of the fundamental optical beam 21 and the second harmonic optical beam 22, while increasing the average power.

As indicated above, FIGS. 12A and 12B are provided merely as examples. Other examples are possible and may differ from what was described with regard to FIGS. 12A and 12B.

In some implementations, the delay time of the third harmonic generator 20 may be designed based on a layout of the third harmonic generator 20. For example, one or more components of the third harmonic generator 20 (e.g., the first beam combiner 25, the dichroic mirrors 25A, the third harmonic crystal 28, the first beam splitter 27, the upper filter 27A, the lower filter 27B, or the second harmonic crystal 26) may be arranged such that a delay time resulting from the non-linear optical loop, associated with the components of the third harmonic generator 20, is approximately equal to, or is an approximate integer multiple of, a laser source round-trip time. As a particular example, one or more components of the third harmonic generator 20 may be placed (e.g., glued, soldered, bolted) such that distances between the one or more components cause the non-linear optical loop length to match (i.e., be approximately equal to or be an approximate integer multiple of) the round-trip optical path length of the laser source, thereby causing the delay time of the third harmonic generator 20 to be approximately equal to, or an approximate integer multiple of, the laser source round-trip time. In other words, the delay time of the third harmonic generator 20 may be designed based on positioning of the one or more component of the third harmonic generator 20.

In some implementations, the delay time design of the third harmonic generator 20 may be implemented using a linear build process. The linear build process may include manufacturing the laser source before placing components of the third harmonic generator 20 (e.g., within a package that houses the laser source and the third harmonic generator 20). For example, a mode beating period of the laser source may be locked (e.g., throughout life of the laser source) after the laser source is manufactured, while a mode beating period of another laser source (e.g., manufactured at another time) may be different than that of the laser source. In other words, mode beating periods of different laser sources may vary slightly. As such, the round-trip optical path length of the laser source may vary from one laser source to another.

Here, once the laser source is manufactured, the linear build process may further include determining the round-trip optical path length of the laser source, determining a non-linear optical path length that matches the round-trip optical path length of the laser source (e.g., when indices of diffraction of materials of components of the third harmonic generator 20 are taken into account), and placing and/or manufacturing components of the third harmonic generator 20 such that the non-linear optical path length of the third harmonic generator 20 matches the round-trip optical path length of the laser source, thereby causing the delay time of the third harmonic generator 20 to be approximately equal to, or an approximate integer multiple of, the laser source round-trip time. In this case, the components of the third harmonic generator 20 are fixed in place (e.g., the components may be glued in place, soldered in place, bolted in place, or the like) such that the non-linear optical path and the delay time of the third harmonic generator 20 are non-adjustable (i.e., fixed).

Additionally, or alternatively, the delay time design of the third harmonic generator 20 may be implemented using an adjustable mechanical component such as a micrometer, a rotary stage, or an adjustable mirror mount that moves one or more optical components within the non-linear optical path, for example a mirror or a prism, thereby allowing the delay time of the non-linear optical path to be adjusted. The inclusion of the adjustable component may allow the non-linear optical path length to be modified after assembly within the package that houses the laser source and the third harmonic generator 20. In such a case, the laser source and the third harmonic generator 20 may be assembled within the package before the round-trip optical path length of the laser source is determined. Here, after assembly, the round-trip optical path length of the laser source may be determined, the non-linear optical path length that matches the round-trip optical path length of the laser source may be determined, and the non-linear optical path of the third harmonic generator may be adjusted, using the adjustable component, accordingly.

Figure 13:
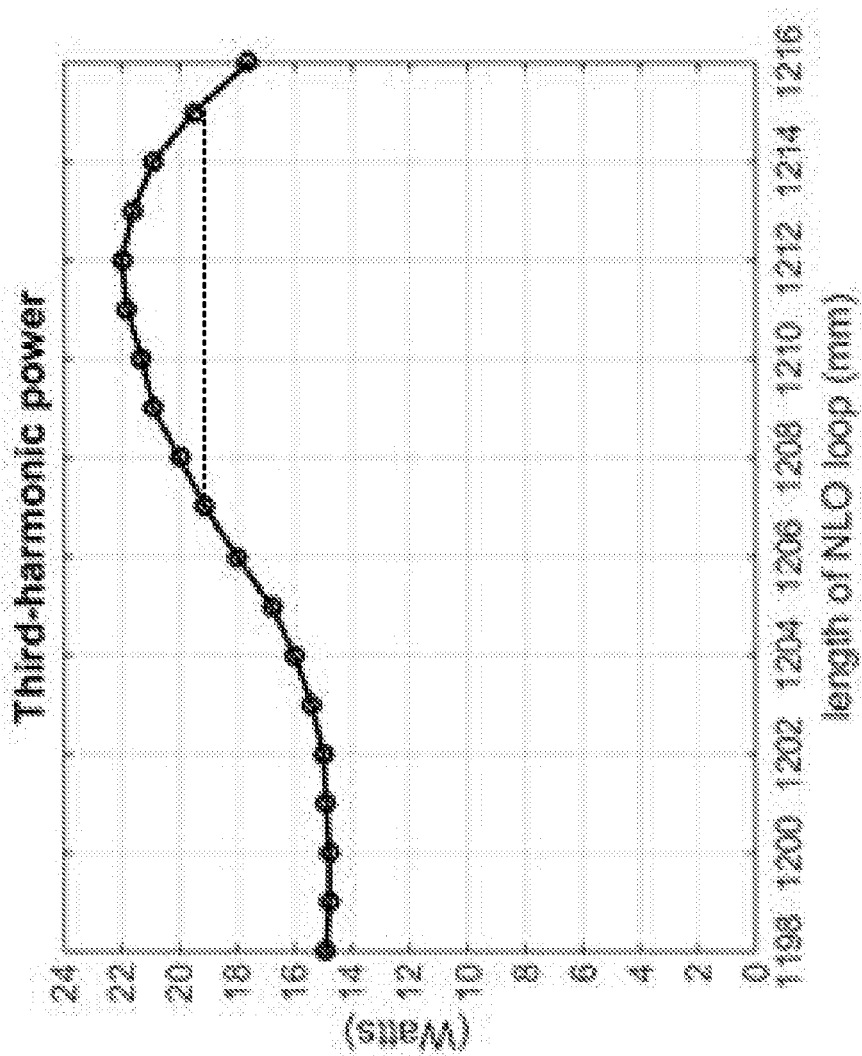
FIG. 13 is a graphical representation showing example conversion efficiencies for a cascaded optical harmonic generator across an example range of non-linear optical loop lengths.

FIG. 13 is a graphical representation of amounts of converted power within a range of non-linear optical loop lengths associated with an example third harmonic generator 20 for some particular laser source having some particular mode beating period. Notably, while FIG. 13 is associated with an example third harmonic generator 20, another type of cascaded optical harmonic generator (e.g., fourth harmonic generator 40, cascaded harmonic generator 60, cascaded harmonic generator 70, third harmonic generator 80, or the like) may provide results of similar effect to those described with regard to the example third harmonic generator 20 associated with FIG. 13.

For the purposes of FIG. 13, the laser source of the fundamental optical beam is a Q-switched multi-longitudinal-mode neodymium-yttrium aluminum garnet (Nd:YAG) laser source with a laser source round-trip time of 4.23 nanoseconds (ns). As such, the round-trip optical path length of the laser source is approximately 1268 millimeters (mm) (e.g., $2.99792458 \times 10^8$ meters (m)/second (s)$\times 1000$ mm/m$\times$ $1.00 \times 10^{-9}$ s/ns$\times 4.23$ ns$\approx 1268$ mm). For the purposes of FIG. 13, assume that a non-linear optical loop length of the cascaded optical harmonic generator that matches the optical path length of the laser source is 1212 mm (e.g., due to an index of refraction of one or more materials associated with the laser source). The non-linear optical loop length may be shorter than the optical path length because the non-linear optical loop length does not take into account the indices of refraction of optical elements in the third harmonic generator 20 which increase the optical path length experienced by a beam.

As shown in FIG. 13, when the length of the non-linear optical loop is equal to 1212 mm, the amount of power converted by the cascaded optical harmonic generator is at a peak of approximately 22 Watts (W). As further shown, as the length of the non-linear optical loop moves away from 1212 mm (i.e., when the length of the non-linear optical loop is shorter or longer than 1212 mm), the amount of converted power decreases. For example, if the non-linear optical loop length is equal to 1198 mm, then the amount of converted power is approximately 15 W. In other words, if the non-linear optical loop length of the cascaded optical harmonic generator is 1212 mm, then an amount of power converted by the cascaded optical harmonic generator improves by approximately 47% as compared to a loop length of 1198 mm (e.g., (22 W−15 W)/15 W$\times$100%=47%).

Here, the enhancement associated with the increased conversion has width of approximately 8 mm (e.g., from a loop length of approximately 1207 mm to a loop length of approximately 1215 mm, as indicated by the dotted line in FIG. 13), implying that mode beating peaks of the laser source are approximately 30 picoseconds (ps) in duration (e.g., (1 s/$2.99792458 \times 10^8$ m)$\times 1 \times 10^{12}$ ps/s$\times 0.001$ m/mm$\times 8$ mm=30 ps). This corresponds to a laser linewidth of approximately 0.1 nanometer (nm) wavelength, which is typical of a Nd:YAG laser source at 1064 nm. As such, the conversion enhancement behaves consistently with theoretical expectations.

As indicated above, FIG. 13 is provided merely as an example. Other examples are possible and may differ from what was described with regard to FIG. 13.

Implementations described herein are associated with designing a delay time of a cascaded optical harmonic generator such that a delay time of the cascaded harmonic generator is approximately equal to, or is an approximate integer multiple of, a laser source round-trip time of a laser source coupled to the cascaded optical harmonic generator. This allows enhancement of power conversion achieved by the cascaded optical harmonic generator due to high power fluctuations in the laser source to be obtained, thereby improving conversion efficiency of the cascaded optical harmonic generator.

The foregoing disclosure provides illustration and description, but is not intended to be exhaustive or to limit the implementations to the precise form disclosed. Modifications and variations are possible in light of the above disclosure or may be acquired from practice of the implementations. For example, while example techniques associated with designing a delay time of a cascaded optical harmonic generator have been described in the context of a Nd:YAG laser source, these techniques may apply to another type of laser source, such as a neodymium-doped yttrium orthovanadate laser source, another type of solid-state laser source, a fiber laser source, or another type of laser source. Fiber lasers in particular can have unusual mode-beating properties relating to their ability to laser simultaneously in two polarization states. In order to implement the present invention on a laser system comprising a dual-polarization fiber laser resonator, the fiber laser should be designed to operate with stable, non-varying polarization axes, and the cascaded harmonic generator should be designed to operate on substantially only one polarization state of the fiber laser resonator.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A cascaded harmonic generator for cascaded optical harmonic generation from an optical beam provided by a laser source, comprising:

a second harmonic generator to generate a second harmonic optical beam based on a residual beam associated with the optical beam; and a third harmonic generator to generate a third harmonic optical beam based on the second harmonic optical beam and the optical beam,
the third harmonic generator being positioned in an optical path upstream from the second harmonic generator,
where a harmonic generator delay time, associated with the optical path, is approximately equal to, or is an approximate integer multiple of, a laser source round-trip time.

2. The cascaded harmonic generator of claim 1, where an optical path length of the optical path matches an optical path length of a round-trip optical path associated with the laser source.

3. The cascaded harmonic generator of claim 1, further comprising an adjustable mechanical component to adjust an optical path length of the optical path.

4. The cascaded harmonic generator of claim 1, where a length of the optical path is fixed.

5. The cascaded harmonic generator of claim 1, further comprising:
a fourth harmonic generator to generate a fourth harmonic optical beam based on the third harmonic optical beam, the second harmonic optical beam, and the optical beam,
the fourth harmonic generator being positioned in the optical path upstream from the third harmonic generator.

6. The cascaded harmonic generator of claim 1, where, at the third harmonic generator, a first fluctuation in the optical beam is approximately synchronized with a second fluctuation in the second harmonic optical beam.

7. The cascaded harmonic generator of claim 1, where the laser source is a solid-state laser.

8. A harmonic generator, comprising:
a higher harmonic generator to generate a higher harmonic optical beam based on a lower harmonic optical beam and an optical beam provided by a laser source; and
a lower harmonic generator to generate the lower harmonic optical beam based on a residual beam associated with the optical beam,
the lower harmonic generator lying on an optical path downstream from the higher harmonic generator, and
the harmonic generator having a harmonic generator delay time, associated with the optical path, that is approximately equal to, or an approximate integer multiple of, a laser source round-trip time.

9. The harmonic generator of claim 8, where an optical path length of the optical path is approximately equal to a length of a round-trip optical path associated with the laser source.

10. The harmonic generator of claim 8, further comprising a component to adjust an optical path length of the optical path.

11. The harmonic generator of claim 8, where a length of the optical path is non-adjustable.

12. The harmonic generator of claim 8, where the lower harmonic generator is a second harmonic crystal and the higher harmonic generator is a third harmonic crystal.

13. The harmonic generator of claim 8, where the lower harmonic generator includes a second harmonic crystal and a third harmonic crystal, and the higher harmonic generator is a fourth harmonic crystal.

14. The harmonic generator of claim 8, where, at the higher harmonic generator, a first fluctuation in the optical beam is approximately aligned with a second fluctuation in the lower harmonic optical beam.

15. The harmonic generator of claim 14, where a third fluctuation in the higher harmonic optical beam is approximately aligned with the first fluctuation and the second fluctuation.

16. A method, comprising:
propagating, by a cascaded harmonic generator and along an optical path, an optical beam through a third harmonic generator,
the optical beam being provided by a laser source;
propagating, by the cascaded harmonic generator and along the optical path, the optical beam through a second harmonic generator to generate a second harmonic optical beam based on the optical beam,
the optical beam being propagated through the second harmonic generator after the optical beam is propagated through the third harmonic generator; and
propagating, by the cascaded harmonic generator and along the optical path, the second harmonic optical beam through the third harmonic generator,
the second harmonic optical beam overlapping the optical beam in the third harmonic generator to permit the third harmonic generator to generate a third harmonic optical beam,
where a delay time, associated with the optical path, is approximately equal to, or is an approximate integer multiple of, a round-trip time associated with the laser source.

17. The method of claim 16, where an optical path length of the optical path is approximately equal to a length of a round-trip optical path associated with the laser source.

18. The method of claim 16, further comprising:
adjusting a length of the optical path such that the optical path length of the optical path matches an optical path length of a round-trip optical path associated with the laser source.

19. The method of claim 16, where the laser source is a fiber laser designed to operate with stable, non-varying polarization axes.

20. The method of claim 16, where, in the third harmonic generator, a first fluctuation in the optical beam is approximately synchronized with a second fluctuation in the second harmonic optical beam and a third fluctuation in the third harmonic optical beam.

* * * * *